No. 755,442. PATENTED MAR. 22, 1904.
E. F. BRICKELL.
AUTOMATIC COUPLING.
APPLICATION FILED OCT. 24, 1903.
NO MODEL.
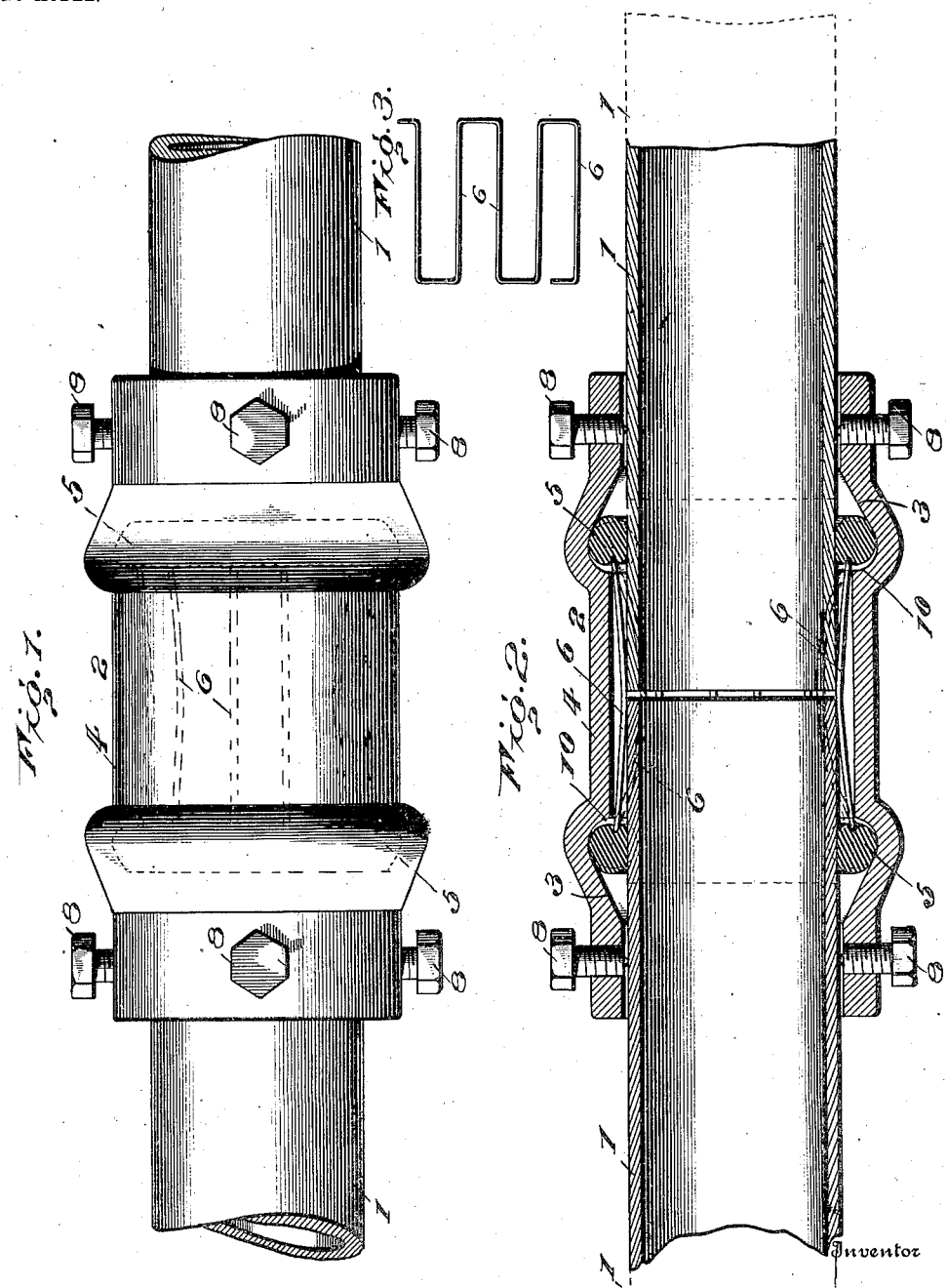
Witnesses
Inventor
E. F. Brickell
By A. S. Pattison
Attorney No. 755,442.

Patented March 22, 1904.

UNITED STATES PATENT OFFICE.

ELI F. BRICKELL, OF BRADFORD, PENNSYLVANIA, ASSIGNOR OF ONE-THIRD TO AUGUST G. NELSON, OF BRADFORD, PENNSYLVANIA.

AUTOMATIC COUPLING.

SPECIFICATION forming part of Letters Patent No. 755,442, dated March 22, 1904.

Application filed October 24, 1903. Serial No. 178,441. (No model.)

*To all whom it may concern:*

Be it known that I, ELI F. BRICKELL, a citizen of the United States, residing at Bradford, in the county of McKean and State of Pennsylvania, have invented new and useful Improvements in Automatic Couplings, of which the following is a specification.

My invention relates to improvements in automatic couplings, and pertains particularly to a coupling intended for use in connection with pipes for coupling adjacent ends thereof.

The object of my invention is to provide a construction whereby the insertion of the ends of the pipes in a casing automatically tightens the packing to make a fluid or air tight connection, whereby a great saving of time is effected in making tight joints between the adjacent ends of pipes.

In the accompanying drawings, Figure 1 is a top plan view of a coupling embodying my invention, the expanding member shown in dotted lines. Fig. 2 is a longitudinal central vertical sectional view. Fig. 3 is a detached view of a portion of the expanding member.

Referring now to the drawings, 1 1 indicate the two pipes with their ends extending into a coupling casing or housing of steel or cast-iron 2. This casing or housing 2 is provided at each end with an internal annular wedge or conical-shaped surface 3 and with an intermediate contracted annular portion 4. Placed within the said casing and within the wedge or conical shaped annular recesses formed by the wedge or conical shaped surfaces 3 are the packings 5. These packings as here shown consist of rubber, though they may be made of other material, as will be readily understood, without departing from my invention.

My improvement consists in the means whereby these packings are compressed or tightened against the adjacent ends of the said pipes 1 automatically when the pipes are placed in position in the casing. The automatic means consists of the member 6, which is normally curved inward between its ends, as shown in dotted lines in Fig. 2, whereby when the ends of the pipes are forced into the position shown in full lines, Fig. 2, the curved portion of said member is forced outward, which expands it, and thus compresses the packings 5 tightly against the ends of the pipes and makes tight joints. The removal of the pipes from the said casing will automatically release the packing, as will be readily understood.

In Fig. 1 the shape of the expanding member 6 is shown in dotted lines, and as here shown it consists of wire, though variations in this effect may be made, as will be readily understood, without affecting materially the spirit and scope of my invention, whereby the insertion of the ends of the pipes will automatically lengthen or expand the member 6 longitudinally, and thereby automatically compress the packings and automatically effect a tight connection between the adjacent ends of two pipes.

If desired, clamping-screws 8 may be used for the purpose of clamping the ends of the pipes within the casing after they are inserted therein, though such a provision is usually unnecessary. In the construction here shown the escape of fluid or air between the ends of the pipes will only tend to force or compress the packing more vigorously and to make the joint all the tighter, if such is possible.

As here shown, the rubber packings 5 are circular in cross-section, and the housing 2 preferably has the abrupt shoulders 10, against which the packings are seated when placed in position before the ends of the pipes are inserted.

Having thus described my invention, what I claim as new, and desire to secure by Letters Patent, is—

1. A coupling comprising a housing adapted to receive the end of a pipe, said housing having a packing-receiving space, a packing located therein, and a member within said housing adapted to be engaged by the end of the pipe and be forced against the packing by the endwise movement of the pipe to compress it.

2. A coupling comprising a housing adapted to receive the adjacent ends of two pipes, said housing provided with two packing-receiving recesses adjacent the ends of said pipes, packings located in said recesses, and a member located within said housing and adapted to engage said packings, said member having a portion normally in the path of the pipe ends as they are placed in the housing and forced by the endwise movement of the pipe in engagement with said packings for compressing them.

3. A coupling comprising a housing adapted to receive the end of a pipe, said housing having an annular packing-recess located external said pipe, an annular packing located therein, and movable means located within said housing, said means having a portion adapted to be engaged by the said pipe when placed in the housing and moved by the endwise movement of the pipe to compress said packing.

4. A coupling comprising a housing adapted to receive the end of a pipe, said housing having an annular packing-recess located external said pipe, an annular packing located therein, and an expanding means located within said housing, said means adapted to be engaged by said pipe when placed in the housing and expanded in contact with said packing by the endwise movement of said pipe.

5. A coupling comprising a housing adapted to receive the adjacent ends of two pipes, said housing having two packing-recesses located respectively external the ends of said pipes, packings within said recesses, and laterally-expanding compressing means within said housing and located between said recesses, said means adapted to engage said packings and having a portion engaged by the ends of said pipes when they are placed within the housing and forced laterally by the endwise movement of the pipe to compress said packings.

6. A coupling comprising a housing adapted to receive the adjacent ends of two pipes, said housing having packing-receiving recesses located respectively external the ends of said pipes, packing located therein, and a packing-compressing member within said housing, the ends of said member adapted to engage said packings to compress them, and provided with a normally inwardly-extending portion adapted to be forced outward by the ends of said pipes when placed in said housing.

7. A coupling comprising a housing adapted to receive the adjacent ends of two pipes, said housing having packing-recesses at each end, packings within said recesses, and a longitudinally-extending packing-compressing member within the housing, the ends of said member adapted to engage said packings and an intermediate portion normally in the path traveled by the ends of said pipes and adapted to be forced outward, the housing having an intermediate contracted portion adapted to prevent the said member from expanding outward between its ends.

8. A coupling comprising a housing adapted to receive the ends of a pipe, said housing having an annular wedge-shaped packing-recess, a packing within said recess, and a member within said housing adapted to be engaged by the end of said pipe and forced endwise against said packing by the endwise movement of the pipe to compress it within said wedge-shaped recess.

In testimony whereof I have hereunto set my hand in the presence of two subscribing witnesses.

ELI F. BRICKELL.

Witnesses:
HARRY T. BRICKELL,
HERMAN H. NORTH.